US007263285B2

(12) United States Patent
Adleman et al.

(10) Patent No.: US 7,263,285 B2
(45) Date of Patent: Aug. 28, 2007

(54) METHOD, APPARATUS AND SYSTEM FOR THE AUTOMATIC PROVISIONING OF A NETWORK ELEMENT

(75) Inventors: Richard Adleman, Colts Neck, NJ (US); Peter L. Bartman, Toms River, NJ (US); Heribert Joseph Blach, Matawan, NJ (US); Ellen Eng, Lincroft, NJ (US); Narasimhan Raghavan, Piscataway, NJ (US); Yan Shi, Plainsboro, NJ (US); Mary Socratous, Colts Neck, NJ (US); William A. Thompson, Red Bank, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 715 days.

(21) Appl. No.: 10/447,015

(22) Filed: May 28, 2003

(65) Prior Publication Data

US 2005/0002669 A1 Jan. 6, 2005

(51) Int. Cl.
*H04B 10/08* (2006.01)

(52) U.S. Cl. ............................. 398/15; 398/30; 398/33

(58) Field of Classification Search ................... 398/15, 398/25, 30, 32, 33, 58, 59
See application file for complete search history.

(56) References Cited

U.S. PATENT DOCUMENTS

| 6,920,288 | B2 * | 7/2005 | Adleman et al. | ............. 398/83 |
| 2002/0093705 | A1 * | 7/2002 | Okano et al. | ............... 359/124 |
| 2002/0097460 | A1 * | 7/2002 | Ikoma et al. | ............... 359/110 |
| 2003/0063343 | A1 * | 4/2003 | Pheiffer et al. | ............. 359/110 |

* cited by examiner

*Primary Examiner*—Dzung Tran

(57) ABSTRACT

A method for the automatic provisioning of a network element (NE) includes receiving a client signal at a tunable optical translator (OT) in the NE, determining the set of channels supported by the OT that are able to correspond to the client signal, eliminating the channels that have connections, that may be present on a line side of the NE in a laser off scan process, or that have not been equipped or otherwise provisioned for transmission, tuning the OT to each of the remaining channels and determining the optical power level of each channel on a line side of the NE in a laser on scan process. Subsequently, the channel with the highest power level is selected to transmit the client signal and associations for a point to point connection for that channel are added for that OT to a database of associations for the NE.

26 Claims, 4 Drawing Sheets

METHOD, APPARATUS AND SYSTEM FOR THE AUTOMATIC PROVISIONING OF A NETWORK ELEMENT

CROSS-REFERENCE TO RELATED APPLICATIONS

This application is related to U.S. patent application Ser. No. 10/093,847, filed Mar. 08, 2002, which is incorporated herein by reference in its entirety.

FIELD OF THE INVENTION

The present invention relates to the field of optical network systems and, more specifically, to the automatic provisioning of network elements.

BACKGROUND OF THE INVENTION

Data communication networks such as optical line systems are continually increasing in both size and complexity. As these networks and systems increase in size, the network management functions proportionally increase in complexity. This means that the critical tasks of network management, such as provisioning (allocating resources to form a communications link), restoration, reinstatement, and such are also further complicated as networks and systems grow.

It is becoming increasingly difficult to efficiently provision optical line systems (OLSs), since the number of fibered connections in a typical OLS may take days to manually provision. Aside from the initial provisioning that is required for an OLS, as additional network elements are added to the OLS, additional provisioning functions must also be entered into a database of associations. In the past, users entered these associations, which were known as interpack connections, into the system database via TL1 commands entered from a craft interface terminal (CIT) or element management system (EMS). However, manual entry of the commands was very time consuming and prone to error, since the process could easily take several hours and require several hundred commands to be entered for the addition of a single network element.

SUMMARY OF THE INVENTION

The present invention addresses these and other deficiencies in the art by providing a method for the automatic provisioning of optical translators (OTs) that support multiple frequencies (e.g., tunable OTs).

Specifically, the method for automatically provisioning a new channel to a network element (NE) of an optical line system (OLS) comprises receiving a client signal at a tunable OT pack in the NE, determining the set of channels supported by the OT that can correspond to the client signal, eliminating the channels that have connections, that may be present on a line side of the NE in a laser off scan process, or that have not been equipped or otherwise provisioned for transmission, tuning the OT to each of the remaining channels and determining the optical power level of each channel on a line side of the NE in a laser on scan process, selecting the channel with the highest power level, and adding associations for a point to point connection for that channel on that OT to a database of associations for the NE.

The automatic provisioning method of the invention may be implemented for connections in end terminal (ET) as well as in optical add/drop multiplexer (OADM) NEs. As such, embodiments of the invention allow for automatic provisioning of tunable optical circuit packs in an OLS based upon optical scans configured to detect the presence of channels that can be supported by the optical circuit packs to carry valid incoming client signals through the NE.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides a novel method, apparatus and system for the automatic provisioning of a network element. Although various embodiments of the present invention herein are being described with respect to the automatic provisioning of end terminals comprising tunable optical translators, it will be appreciated by those skilled in the relevant art informed by the teachings of the present invention, that the concepts of the present invention may be used to automatically provision various other network elements, such as optical add/drop modules. Furthermore, although various embodiment of the present invention herein are being described via the implementation of a software transmission code utilizing specific commands, it will be appreciated by those skilled in the relevant art informed by the teachings of the present invention, that other software and hardware comprising substantially similar functionality as the software described herein, may be implemented within the present invention.

Figure 1:
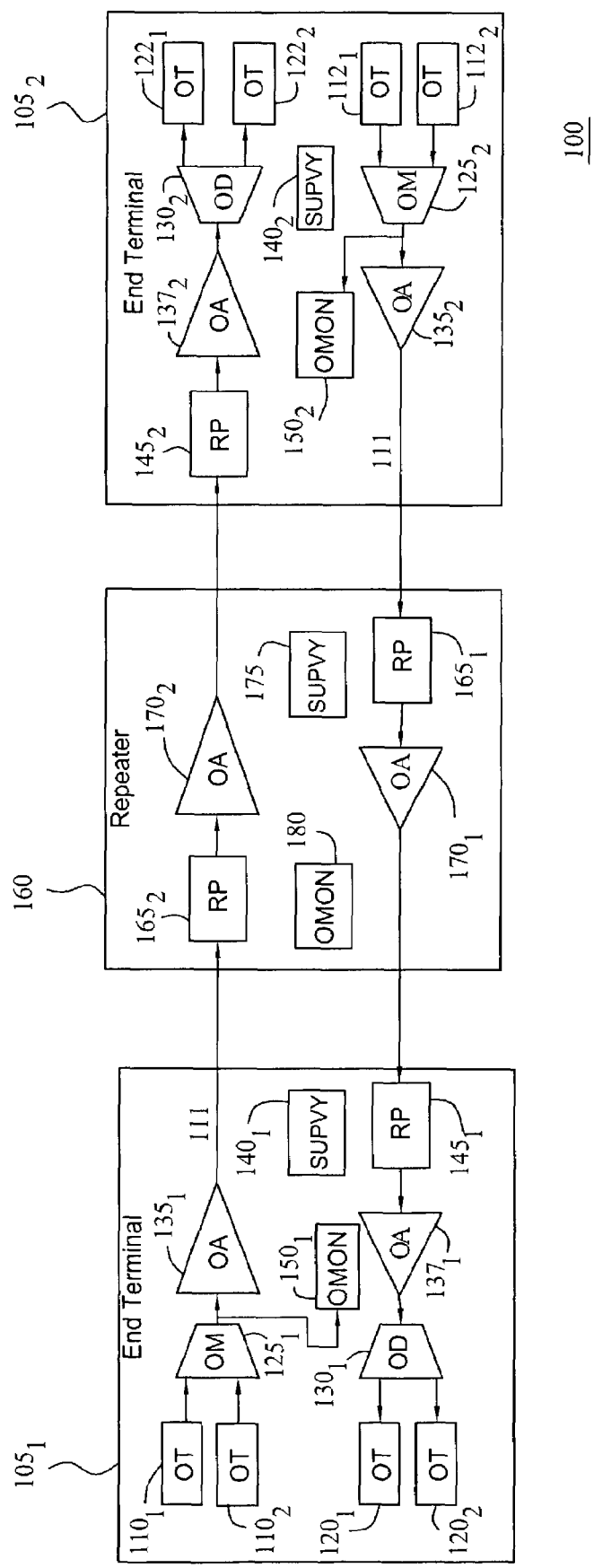
FIG. 1 depicts a high level block diagram of an embodiment of an optical transport platform in accordance with the present invention.

FIG. 1 depicts a high level block diagram of an embodiment of an optical transport platform 100 in accordance with the present invention. The optical transport platform 100 comprises, illustratively, two end terminals (ETs) $105_1$ and $105_2$ (collectively ETs 105), and a repeater 160 positioned there-between. Optical signals transmitted between the ETs 105 are amplified by the respective ETs 105 and by the repeater 160, such that the signals maintain a sufficient power throughout transmission.

Each of the ETs $105_1$, $105_2$ comprises a plurality of output tunable optical translators (OTs) (illustratively two optical translators each) $110_1$, $110_2$ and $112_1$, $112_2$, respectively. Each of the ETs $105_1$, $105_2$ further comprises a plurality of input tunable OTs (illustratively two optical translators each) $120_1$, $120_2$ and $122_1$, $122_2$, respectively. Each of the ETs $105_1$, $105_2$ further comprises a respective optical multiplexer (OM) $125_1$ and $125_2$, a respective optical demultiplexer (OD) $130_1$ and $130_2$, a respective output optical amplifier (OA) $135_1$ and $135_2$, a respective input OA $137_1$ and $137_2$, a respective supervisory pack (SUPVY) $140_1$ and $140_2$, a respective Raman pump $145_1$ and $145_2$, a respective detector (illustratively an optical channel monitor (OMON)) $150_1$ and $150_2$, and a respective optical fiber $111_1$ and $111_2$.

The repeater 160 comprises two Raman pumps $165_1$ and $165_2$, two optical amplifiers $170_1$ and $170_2$, a SUPVY 175, and an OMON 180.

The respective output tunable OTs 110 and 112 are in optical communication with the respective OMs $125_1$ and $125_2$. The respective input tunable OTs 120 and 122 are in optical communication with the respective ODs $130_1$ and $130_2$. The tunable OTs 110, 112, 120 and 122 are used for converting between wavelengths from client equipment (typically in the range of microns, e.g., 1.3 to 1.55 micron wavelengths) and one of a plurality of wavelengths and bit rates that are supported by the tunable OTs for use in the optical transport platform 100. As such, the tunable OTs 110, 112, 120 and 122 are respectively positioned at the entry and exit points of the ETs 110.

The OMs $125_1$ and $125_2$ receive optical signals having various wavelengths from the respective output tunable OTs 110, 112 and combine the optical signals. The respective combined optical signals are then transmitted on a respective common optical fiber and communicated to the respective OAs $135_1$ and $135_2$.

The OAs 135 provide amplification to the multi-wavelength signal passing there-through for transmission on the respective optical fiber 111. Typically, OAs are used at the transmitting and receiving ends of an optical line as well as within intermediate repeater sites, such as depicted in the repeater 160 of FIG. 1.

The input/receiving side of each of the ETs 105 includes a respective Raman pump $145_1$ and $145_2$ in optical communication with a respective input side OA $137_1$ and $137_2$. The Raman pumps 145 provide gain to a propagating optical signal via stimulated Raman scattering. Typically, both co-propagating and counter-propagating Raman pumps are included in OA packs. Additionally, growth-type Raman pumps (not shown) may be added to platform 100 as the system grows via the addition of elements and/or packs.

Output signals from the respective input OAs 137 are communicated to the respective ODs $130_1$ and $130_2$. The ODs 130 separate the multiple wavelengths of optical signals from the OAs 137. The multi-wavelength optical signals are separated into individual channels, which are propagated via individual optical fiber channels. The output fiber channels of each of the ODs $130_1$, $130_2$ communicate the optical channels to the respective input tunable OTs 120, 122 which convert the received wavelengths into a preferred wavelength for processing.

The respective SUPVY $140_1$, $140_2$ of the ETs $105_1$, $105_2$ are control mechanisms/systems configured to regulate and/or control the ET 105 operation and ET 105 communication with external devices. The SUPVY 140 control functions such as node-to-node communications, automatic power shut down (APSD) recovery, automatic power reduction (APR) recovery, and the like.

The respective OMON $150_1$, $150_2$ of the ETs $105_1$, $105_2$ are configured to measure signals tapped at several critical locations within the ET 105 and allow the control system to set the various control parameters to the appropriate values in support of the overall transmission process in response to the measurements. Typically, OMON include an optical spectrum analyzer (OSA) configured to analyze optical signals.

The ETs 105 also include multiple levels of software operating thereon to control the operation thereof, and further, to control the provisioning process involved with the addition of elements or packs to the platform 100 after the platform 100 is originally configured and brought online. The software or control systems of the present invention reside at multiple levels of platform 100.

For example, as noted above, spectrum analyzer processes used in channel detection and autodiscovery are controlled by the respective OMON 150. In addition, illustratively, FltSupOt software running on the tunable OTs 110,112, 120 and 122 is configured to control the operation of the tunable OTs 110, 112, 120 and 122 is used during the autodiscovery process. Another level of software running on an ET network element (NE) control pack (NCTL), illustratively OptConDir, is used to control the general functionality of the autodiscovery and autoprovisioning processes. Yet another level of software running on the NCTL, illustratively OsaDir, operates to control optical scans via the OMON 150. This particular software level may operate to process requests from other software objects on the NE, assign a priority to every incoming request and queue them accordingly, and allocate an OMON 150 to the highest priority event in the queue as soon as it becomes available.

In one embodiment of the present invention, the autodiscovery and autoprovisioning process of the present invention begins when the tunable OTs 110,112, 120 and 122 determine (illustratively via the FltSupOT software) that a new and valid client signal has been received therein. When a new and valid client signal has been received by a respective tunable OT 110, 112,120 and 122, the line side laser within the respective OT is off. At this time, the respective tunable OT that received the new and valid client signal sends a signal to the NCTL requesting the initiation of an autodiscovery process (illustratively via the OptConDir software) to determine the provisioning parameters for the new optical channel. The new and valid client signal is integrated for a period of time to ensure it is not superfluous.

The NCTL receives the request to initiate the autodiscovery and autoprovisioning process, initializes the necessary variables for the channel discovery process, and begins the process (illustratively via the OptConDir software). The channel discovery process includes determining the set of frequencies (throughout the specification the use of "frequency" and "channel" may be used interchangeably) supported by the tunable OTs 110, 112, 120 and 122, eliminating the frequencies that have been pre-provisioned or that have existing channels, eliminating the frequencies that the subject NE has not been provisioned with for supporting the transmission on the platform 100, determining the optical power level of each of the remaining frequencies when a tunable OT is tuned to that frequency in an optical scanning, and determining the associations for the newly fibered connection for the frequency with the highest optical power. Once the associations for the newly fibered connection are determined in the scanning process, the associations may be input into an association database for the platform 100.

More specifically, the autodiscovery and autoprovisioning process of the present invention begins when a tunable OT 110, 112, 120 and 122 determines that a new and valid client signal has been received therein. For example, when a tunable OT is first booted or initiated without a pre-existing connection, an object in the software (illustratively, the portSup software) checks to determine if an input port can be auto-discovered. If the input port is a line port, that is a port not associated with a client signal but a port associated with the signal from the OD, the object associated with the port enters the wait for connection state. The object waits for a connection to be made either automatically or manually. Alternatively, if a port that can receive a client signal and therefore can be auto-discovered is found, the object associated with the port enters the signal-not-present state after setting a periodic timer to initiate the client signal detection sequences. When the time or delay expires, the object initiates an infrastructure call to access the hardware used to determine if a valid client signal is present. The determination of whether or not a valid signal is present includes determining if the optical signal has sufficient magnitude, does not have LOS or LOF, and is of a bit rate compatible with the OT. If the signal is determined to be valid, the client signal is integrated.

Alternatively, if the client signal is not valid, it will remain in the signal-not-present state, or alternatively, if the signal is of sufficient magnitude and an LOS and/or LOF condition exists, then an alarm will be issued. Once the method is in signal integration state, the tunable OT integrates the client signal, to eliminate the auto-discovery of a spurious or transient client signal, for a period of time (for example, five seconds) to ensure the signal is present and is not intermittent. If the client signal is removed before the integration time expires, the portSup object will transition to the signal-not-present state to restart the auto-discovery client signal-checking phase.

Alternatively, if the client signal remains stable for the integration period, the process continues to the send auto-discovery start signal. Once auto-discovery has started (illustratively when the OptConDir object notifies the portSup object), the process will continue to wait for connection. When a valid connection has been determined to be present by the OptConDir object of the network element control, the portSup object will be notified and exit the wait for connection state and exit the auto-discovery process, as the discovery process for the tunable OT has concluded. A connection timer is used when the portSup object times out while waiting for the connection verification. In this state, the portSup object will query the database to determine if a connection was made but failed to receive confirmation from the OptConDir or if no connection has been discovered. The portSup object then re-enters the wait for connection state. If the tunable OT is not connected properly to other components in the system and the OptConDir object has raised an alarm to indicate this condition, then the portSup object will notify the OptConDir object when the client signal is removed. The OptConDir object will then clear the alarm and auto-discovery can resume once the proper connections are made and a valid client signal is applied back into the respective tunable OT. That is, the tunable OT that received the new and valid client signal sends a "start discovery" message to the OptConDir software running on the NCTL requesting the initiation of an autodiscovery process to determine the provisioning parameters for the new optical channel.

The OptConDir software initializes variables necessary to conduct the autodiscovery process. Initialization includes determining the set of frequency (channel) and line combinations that will be tested in the channel discovery process based on the possible frequencies that can be supported by the tunable OT whose "startdiscovery" message is being processed and the number of lines supported by the configuration of the NE, such as an ET or an optical add/drop module (OADM). For example, an ET typically has one line (east) while an OADM typically has two lines (east and west). A tunable OT on an OADM with a valid client signal that is requesting for autodiscovery may be adapted for transmission on either line and, therefore, the channel auto-discovery process will be performed on both lines. Hereinafter, the set of eligible frequencies (channels) and line combinations described above will be referred to as the "set".

Next, it is determined if a valid pre-existing connection exists for the tunable OT. That is, if the pre-existing connection is determined to be an error condition the autodiscovery process is ended. If a valid pre-existing connection exists for the tunable OT that requested the autodiscovery process, it is then determined which of the frequency and line combinations in the set have valid pre-existing connections. Any frequency and line combination with a pre-existing connection are eliminated from the set, thereby discontinuing that frequency and line combination from further testing in the channel discovery process. That is, any frequency and line combinations with the set that have a valid pre-existing connection are eliminated from the possible set of frequency and lines that can be assigned to the new client.

It is then determined if the set is empty. That is, if the set is empty (i.e., no available frequency and line combinations supported by the tunable OT that requested the autodiscovery process left to assign to the new client) the autodiscovery process is terminated. If there are still frequency and line combinations remaining in the set, more pre-scanning checks for each of the frequency and line combinations are performed. These pre-scanning checks include verifying that the NE is capable of utilizing the remaining frequency and line combinations. For example, for the case of an OADM NE, it is verified that the pre-provisioned blocker positions are capable of adding and dropping each of the remaining respective frequency and line combinations at the NE. Any frequency and line combination that does not pass these pre-scanning checks will be eliminated from the set, thereby discontinuing that frequency and line combination from further testing in the channel autodiscovery process.

Once again it is determined if the set is empty. That is, if the set is empty (i.e., no available frequency and line combinations supported by the tunable OT that requested the autodiscovery process left to assign to the new client) the autodiscovery process is terminated. If there are still frequency and line combinations remaining in the set, the OMON scanning process is then performed. The OMON scanning process, which will be further described below with respect to FIGS. 3 and 4, includes performing a series of "laser off" scans and then a series of "laser on" scans. A laser off scan is conducted for each line with the tunable OT laser substantially off to determine the channels transmitting on the line side of a transmit OA. Although the above described scan with the tunable OT laser substantially off is termed a laser off scan, it will be appreciated by those skilled in the art and informed by the teachings of the present invention, that a laser off scan does not require the tunable OT laser to be off, but requires that signals from the tunable OT lasers not be used in the scan. As such, the signals from the tunable OT lasers may be blocked or de-energized in such an amount as to be negligible.

Based on the laser off scan for a line, any frequencies that have a signal on the line are eliminated from the set because transmitting on those frequencies on which the NE is already transmitting would corrupt the transmission of an existing channel. The number of laser off scans is dependent on the number of lines supported by the NE configuration.

In alternate embodiments of the present invention, the laser off scans are performed on the OM's OMON port immediately before the fiber connecting the OM to the transmit OA. Therefore, conceptually, the present invention may scan the transmit OA while, physically, the invention may be scanning on the OM. That is, a fiber connects the OM to the OA and as such (assuming a good fiber connection between the OM and transmit OA) all of the signals existing on the OMON scan performed at the OM are substantially the same signals found when scanning the transmit OA (of course the signals will have different power levels). However, there are pros and cons to scanning at the OM versus the OA. When scanning on the OM, the signal is cleaner at the OM as it is closer to the source. In addition, the insertion of transients due the adding or removing of individual channels is reduced when scanning at the OM, and any distortion caused by the transmit OAs amplifiers being set at incorrect levels will not impact the OM scan. On the other hand, if the scan is performed at the transmit OA, the fiber connection between the OM and OA is implicitly validated as well.

Returning to the concepts of the invention, after eliminating the frequencies that have a signal on the line during a laser off scan, it is once again determined if the set is empty. If the set is empty the autodiscovery process is terminated. If there are still frequency and line combinations remaining in the set, laser on scans are performed. A laser on scan is conducted for a line with the tunable OT laser on and tuned to a frequency to determine the optical power level of that channel on the line. The tunable OT laser is turned on and, for each of the remaining frequency and line combinations, tunes the laser to the frequency and performs a laser on scan on the line, testing for that frequency. The power level of the signal for each frequency and line is measured by the OMON and then recorded in a memory (e.g., a RAM of the NE) by the OptConDir software.

The frequency and line with a highest power level relative to the power levels of the other frequency and line combinations being tested during the laser on scan process are selected to carry the new valid incoming client signals through the NE. The newly configured connection is committed to an association database configured to store connection associations representative of the individual fiber connections within the platform 100. Once the determined associations are committed to the database, the autodiscovery process is terminated.

In alternate embodiments of the present invention, the laser on scans are performed on the OM's OMON port immediately before the fiber connecting the OM to the transmit OA. Therefore the present invention may scan the transmit OA while, physically, the invention may be scanning on the OM. However, various implementations may allow for and/or favor conducting the scans at the output of the OM as compared to the transmit OA. For example, before a first channel is added, the pumps of the transmit OA are either turned down or off, and the initial moments after turning on the pumps during the laser on scan process upon detection of an optical signal from the tunable OT whose autodiscovery request is being processed may exhibit unstable power levels and may, therefore, cause unpredictable autodiscovery results.

Figure 2:
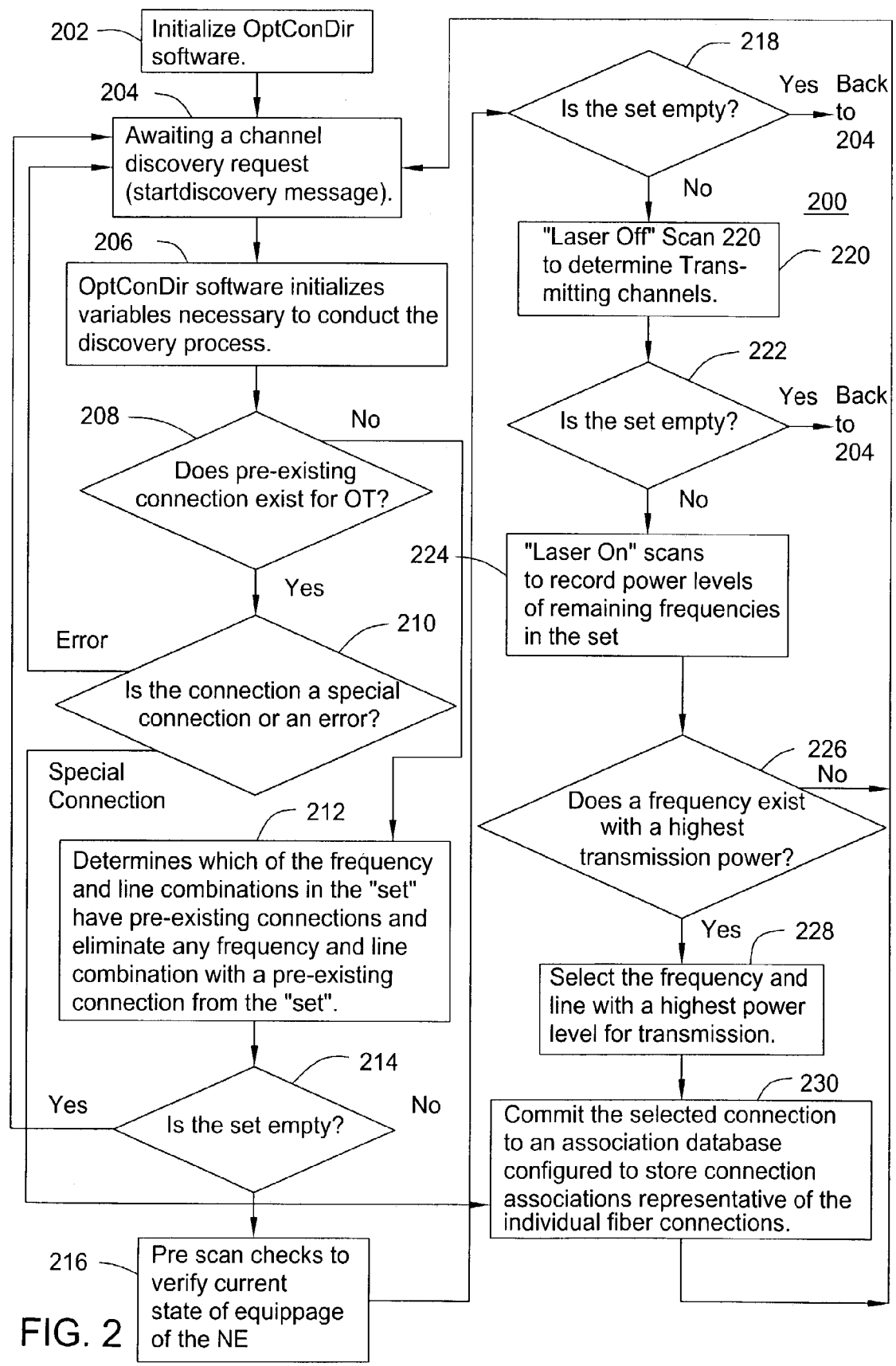
FIG. 2 depicts a flowchart of an embodiment of a method for autodiscovery and autoprovisioning in accordance with the present invention.

FIG. 2 depicts a flowchart of an embodiment of a method for autodiscovery and autoprovisioning in accordance with the present invention. The method 200 is entered at step 202, wherein the respective elements and objects of the OptConDir software are configured for operation. That is, before the OptConDir software can process any discovery request, the system and OptConDir needs to be initialized and ready, meaning that "infrastructure" and resources that the OptConDir requires need to be available. Such "infrastructure" and resources include, but are not limited to, the DataBase, IPC (inter process communication), and the OMON, to name a few. This initial "waitForConfig" step only applies to system restart, such as power up or reboot. The method 200 then proceeds to step 204.

At step 204, the OptConDir software lies in a "wait" state awaiting a channel discovery request. Once a discovery request (known as a "startdiscovery" message) is received by the OptConDir software from the FltSupOT software the method 200 proceeds to step 206. It should be noted that the OptConDir software receives the supported frequencies and physical slot within the NE of the OT within the "startdiscovery" message.

At step 206, the OptConDir software initializes variables necessary to conduct the discovery process. Initialization includes determining the set of frequency and line combinations that will be tested in the channel discovery process based on the possible frequencies that can be supported by the tunable OT whose "startdiscovery" message is being processed and the number of lines supported by the configuration of the NE (e.g., an ET or an optical add drop module (OADM)). Hereinafter, the set of eligible frequencies and line combinations will be referred to as the set. An ET typically has one line (east) while an OADM typically has two lines (east and west). For example, a tunable OT on an OADM with a valid client signal that is requesting for autodiscovery may be fibered for transmission on either line and, therefore, the channel discovery process will be performed on both lines. The method 200 then proceeds to step 208.

At step 208, the method 200 determines if a pre-existing connection exists for the tunable OT. A pre-existing connection is determined to exist if the association database contains a connection for the physical slot or all of the frequency combinations within the set, defined above, have already been provisioned. If a pre-existing connection exists, the method 200 proceeds to step 210. If a pre-existing connection does not exist the method 200 proceeds to step 212.

At step 210, the method 200 further determines if the pre-existing connection is a special case or an error condition. If the connection is a special case, the method proceeds to step 230. If the connection is an error condition the method 200 returns to step 204 to await the next autodiscovery request.

At step 212, the method 200 determines which of the frequency and line combinations in the set have pre-existing connections. Any frequency and line combination with a pre-existing connection are eliminated from the set, thereby discontinuing that frequency and line combination from further testing in the channel discovery process. The method 200 then proceeds to step 214.

At step 214, the method 200 determines if the set is empty. If the set is empty, the method returns to step 204 to await the next autodiscovery request. If there are still frequency and line combinations remaining in the set, the method proceeds to step 216.

At step 216, the method 200 continues with more pre-scanning checks for each of the frequency and line combinations. These pre-scanning checks include verifying that the current state of equipage of the NE and, for the case of an OADM NE, that the pre-provisioned blocker positions, which will be further discussed below, are capable of supporting the adding and dropping of each of the remaining respective frequency and line combinations at the NE. Any frequency and line combination that does not pass these pre-scanning checks will be eliminated from the set, thereby discontinuing that frequency and line combination from further testing in the channel discovery process. The method 200 then proceeds to step 218.

At step 218, the method 200 determines if the set is empty. If the set is empty, the method returns to step 204 to await the next autodiscovery request. If there are still frequency and line combinations remaining in the set, the method proceeds to step 220.

At step 220, the method 200 performs the OMON scanning process. The OMON scanning process, which will be further described below with respect to FIGS. 3 and 4, includes performing a series of laser off scans and then a series of laser on scans. The laser off scan is conducted for a line with the tunable OT laser off to determine the channels transmitting on the line side of the transmit OA. Based on the laser off scan for a line, the method eliminates from the set any frequency that has a signal on the line so that the frequency will not be subsequently tested in the laser on scan with the tunable OT laser on and transmitting at the frequency which would cause a collision with the existing signal of the same frequency. The number of laser off scans is dependent on the number of lines supported by the NE configuration. The method 200 then proceeds to step 222.

At step 222, the method 200 determines if the set is empty. If the set is empty, the method 200 returns to step 204 to await the next autodiscovery request. If there are still frequency and line combinations remaining in the set, the method 200 proceeds to step 224.

At step 224, the method 200 continues with the laser on scans. The laser on scan is conducted for a line with the OT laser on and tuned to a frequency to determine the optical power level of that channel on the line. The method turns on the OT laser and, for each of the remaining frequency and line combinations, tunes the laser to the frequency, performs a laser on scan on the line testing for that frequency, and records the power level of the signal for that frequency and line. The method 200 then proceeds to step 226.

At step 226, the method 200 determines if a frequency and line exist with a highest power level relative to the power levels of the other frequency and line combinations being tested during the laser on scan process. If such a frequency and line do not exist, the method 200 returns to step 204 to await the next autodiscovery request. Such a situation can be encountered if, for example, the OT has been misfibered or if the fiber is defective or dirty. If such a frequency and line do exist, the method 200 proceeds to step 228.

At step 228, the method 200 selects the existing frequency and line with a highest power level for transmission. The method 200 then proceeds to step 230.

At step 230, the method 200 commits the connection to an association database configured to store connection associations representative of the individual fiber connections within the platform 100, and leaves the OT laser in the on state. Once the determined associations are committed to the database, the method 200 returns to step 204 to await the next autodiscovery request.

Additionally, in alternate embodiment of the present invention, when an error is encountered during autodiscovery, an error is reported to a user. This identification of errors assists installers in pinpointing the root cause of problems that conventionally require substantial time to locate. For example, some of the errors that may be reported are "existing connections", "missing circuit packs", or "missing fiber".

Figure 3:
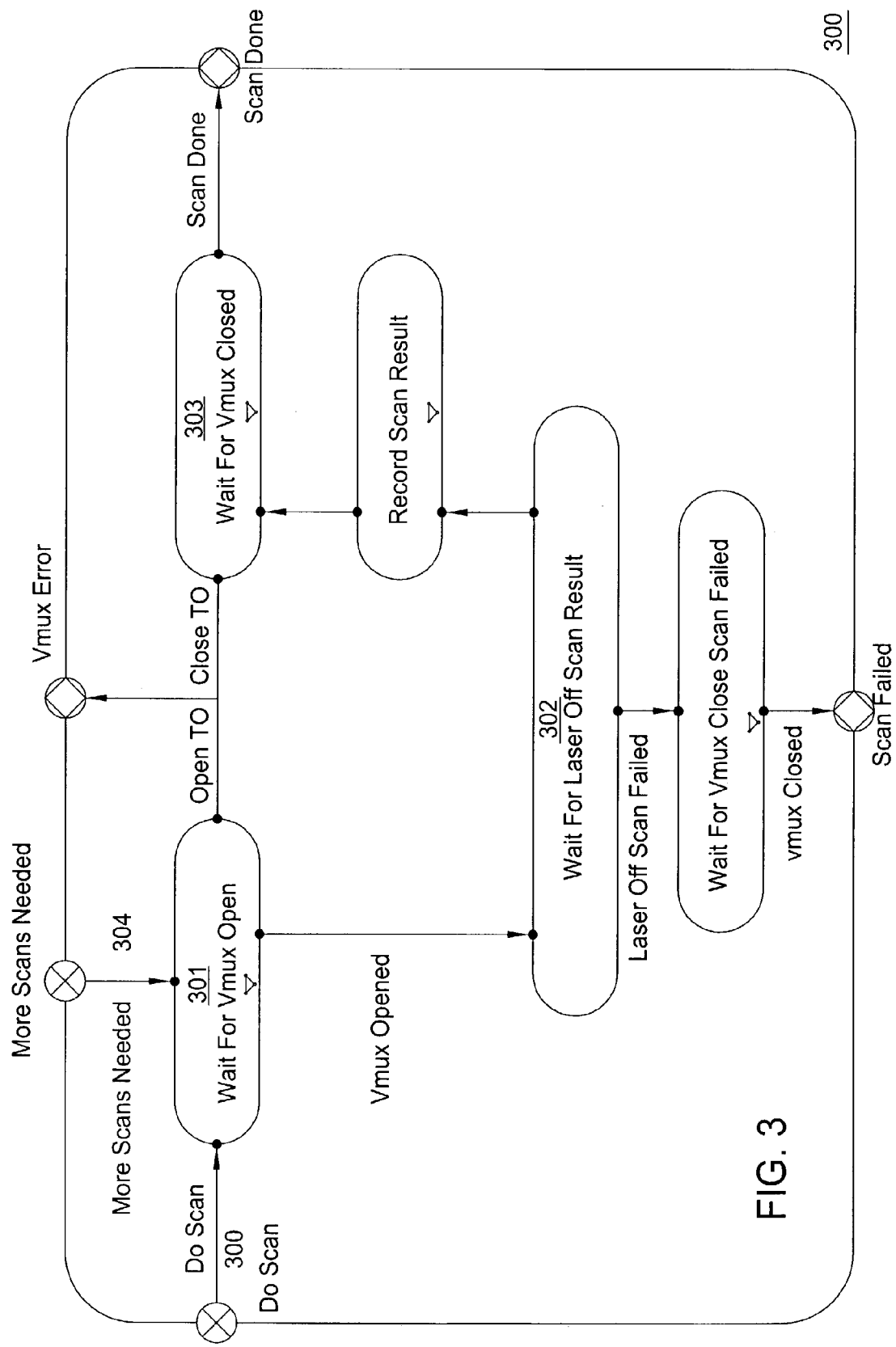
FIG. 3 depicts a flowchart of an embodiment of a method for a laser off scanning process in accordance with the present invention.

FIG. 3 depicts a flowchart of an embodiment of a method for a laser off scanning process in accordance with the present invention. The exemplary laser off scanning process begins at step 300 with the "doScan" instruction, which corresponds to the initiation of an OMON scanning process in step 220 of the method 200 of FIG. 2. Based on the remaining frequency and line combinations in the set, the method selects a line for a laser off scan. At step 301, the method opens the VMUXes corresponding to the frequencies to be tested on the line. VMUXes will be further discussed herein. The method then proceeds to step 302, where the laser off scan is conducted. The laser off scan includes scanning each of the channels of a line on the platform with the laser of the OT whose autodiscovery request is being processed in the off state to determine if any of the remaining frequencies for the line are transmitting. The method will eliminate any frequency and line combination whose frequency is transmitting on the line from further testing in the channel discovery process. After the scanning is completed, the method proceeds to step 303, which closes the VMUXes opened in step 301. When the laser off scan process is completed, the method will determine if additional laser off scans are necessary based on the set of remaining frequency and line combinations. In general, the number of laser off scans is dependent on the number of lines supported by the NE configuration. If the method determines that additional laser off scans are necessary, the process will be repeated via step 304 which determines the next line for the laser off scan. If any scanning error in the laser off scan process is encountered, the method will close the VMUXes opened in step 301 and return to step 204 in the method 200 of FIG. 2 to await the next autodiscovery request.

Figure 4:
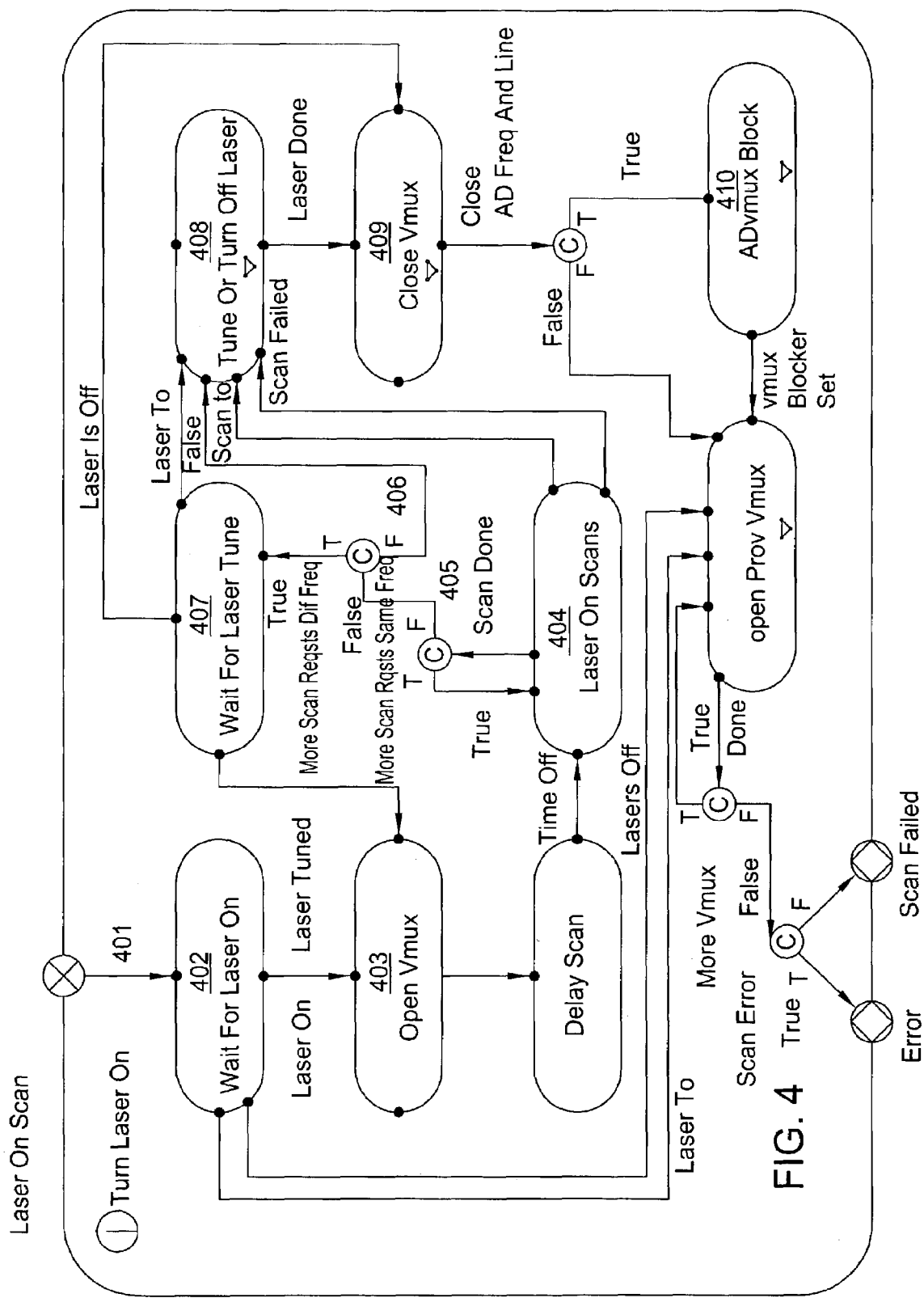
FIG. 4 depicts a flowchart of an embodiment of a method for a laser on scanning process in accordance with the present invention.

FIG. 4 depicts a flowchart of an embodiment of a method for a laser on scanning process in accordance with the present invention. The laser on scanning process begins at step 401, where the OptConDir software communicates with the FltSupOT software in the OT whose autodiscovery request is being processed to turn on the OT laser, tune the laser to one of the remaining frequencies, and begin transmitting an alarm indication signal (AIS) through the network. Step 402 is configured to wait for the OT laser to power up, stabilize, center, and begin transmitting the desired optical signal. Once the OT laser is on and tuned to the specific frequency, the method continues to step 403, which opens the VMUX(es) corresponding to the tuned frequency. After opening the VMUX(es), the method proceeds to step 404, where the laser on scan is conducted. The laser on scan includes scanning each of the channels of a line on the platform with the laser of the OT on and tuned to a specific frequency to determine the optical power of the frequency on the line. After the scanning is completed, the method proceeds to step 405, which determines if additional laser on scans are necessary for the same frequency based on the set of remaining frequency and line combinations. In general, the number of laser on scans for a frequency is dependent on the number of lines supported by the NE configuration. If additional laser on scans are necessary for the same frequency, the method returns to step 404 to conduct the laser on scan for another line. If, however, additional laser on scans for the same frequency are not necessary, the method proceeds to step 406, which determines if the laser on scanning process is completed. If the laser on scanning process is not done, the method will select the next frequency to be tested based on the set of remaining frequency and line combinations and, in step 407, request the FltSupOT software to tune the laser to the frequency. After the OT has been tuned to the frequency, the method will return to step 403 to repeat the aforementioned laser on scan process for the frequency. If, however, at step 406, the method determines that the laser on scan process is done, the method proceeds to step 408. If the method has selected a frequency and line for a connection, the OptConDir software will, if necessary, request the FltSupOT software to tune the OT laser to the selected frequency. If the method has determined that a connection cannot be discovered, the OptConDir software will request the FltSupOT software to turn the OT laser off. The method then proceeds to step 409, where the VMUX(es) for all but the selected frequency and line, if any, are closed. If the method has selected a frequency and line and the NE configuration is an OADM, the method proceeds to step 410, where it opens the OM blocker for the frequency and line. Blockers will be discussed further herein.

The scanning processes of alternate embodiments of the present invention include selective control over VMUXes, which are in optical communication with the OMs of the platform 100. Typically, a VMUX is a 32-channel attenuation device that resides at the input of an OM. VMUXes are used to "block" an optical signal from entering the OM for a channel where there is not a connection and, additionally, flatten a tunable OT input signal power for channels where there are connections. Note that depending on a tunable OT laser's vintage, the output power may vary by +/−2 dB. However, the output from the OMs should be substantially flat, and, therefore, VMUXes are used as per channel attenuators to flatten the OT signal powers. As such, the VMUXes located at the inputs of the OMs will function to attenuate individual tunable OT power levels, such that the output of the VMUXes is flat. As such, during the laser off and laser on scans of the autodiscovery method of the present invention, the OptConDir software may partially open and close the VMUXes in order to allow any new signals through to the scan points as illustrated in FIGS. 3 and 4 above.

The autodiscovery and autoprovisioning processes on OADM nodes are more complicated than on ETs as OADM nodes interact with two lines (east and west) and implement "blockers" on OADM OD and OM packs. The fact that OADM nodes interact with two lines modifies the scanning algorithm since a new tunable NE may be connected to either the east or west side of the optical path. Therefore, the software of the present invention may perform more than one laser off scan and laser on scan per frequency to discover the fibered connection. Moreover, OADM nodes may direct optical traffic through an NE in addition to simply adding or dropping it as with ETs. Therefore, if optical traffic is directed through the NE, a signal received on the east side is passed through and then sent out on the west side, and vice versa. Alternatively, if a channel is added or dropped, the channel is terminated at an OT on the NE and does not pass through the NE. In other words, data received on the east side does not get switched through to the west side but rather is terminated at some customer equipment.

The directing of optical traffic in an OADM node is affected by OD blockers. OD blockers are typically manually provisioned. Furthermore, the east and west OD blockers are typically configured to be in the same state. If the OD blockers are in the through position for one of the frequencies supported by the tunable OT, the frequency must be denied from being discovered because when a channel/frequency is switched through an NE, the software must not allow a connection to be provisioned for that frequency. As such, manual provisioning of the OD blockers entails complex processing. For example, any add/drop connection for a frequency needs to be automatically deleted when the OD blockers for the frequency are provisioned from the add/drop position to the through position.

OM blockers operate substantially the same as OD blockers, but serve different purposes. OM blockers are used to control whether a signal is allowed to pass through the OM. OM blockers are provided per frequency and line, such that, if an OM blocker for a frequency on the east line is closed, for example, a customer signal fibered into that frequency on the OM for the east line will be blocked from passing through the OM as a result thereof. As such, OM blockers ensure that the through signals are not destroyed by client signals mistakenly communicated (fibered) to the OM. When the OD blockers for a given frequency are in the through position, both OM blockers for that frequency must be in the block position. If, however, the OD blockers for a frequency are in the add/drop position, the position of the OM blockers depends upon whether a connection is provisioned for that particular line and frequency.

As such, in view of the functionality of the OM blockers, after a frequency has been discovered on a line, the OM blocker is opened for that frequency and line, otherwise, the channel will be blocked from being transmitted to the transmit OA and, subsequently, onto the network.

While the forgoing is directed to various embodiments of the present invention, other and further embodiments of the invention may be devised without departing from the basic scope thereof. As such, the appropriate scope of the invention is to be determined according to the claims, which follow:

What is claimed is:

1. A method for automatically provisioning a channel added to a network element, comprising:
   receiving a client signal at a tunable optical translator of the network element;
   determining a set of channels supported by the tunable optical translator that can support the client signal;
   eliminating unusable channels from the determined set of channels;
   determining the optical transmission power level of each remaining channel in the set; and
   selecting a channel with the highest determined optical transmission power level to transmit the client signal.

2. The method of claim 1, wherein unusable channels are channels selected from the group consisting of channels that have existing connections, channels that have signals present on a line side of the network element in a laser off scan process, and channels that have not been equipped or otherwise provisioned for transmission.

3. The method of claim 2, wherein said laser off scan process comprises substantially turning off a signal transmission laser in the tunable optical translator and conducting an optical spectrum analysis on an optical output of a line side of the network element to determine, for each of the channels in the set, if a signal is present on a line side of the network element.

4. The method of claim 1, wherein determining the optical transmission power level of each remaining channel comprises:
   tuning the optical translator to each of the remaining channels in the set; and
   performing a laser on scan process for each of the remaining channels in the set.

5. The method of claim 4, wherein said laser on scan process comprises turning on a signal transmission laser in the tunable optical translator and conducting an optical spectrum analysis on an optical output of a line side of the network element to determine the optical transmission power level.

6. The method of claim 1, further comprising:
adding to a database of associations, a point to point connection association reflecting the selected channel for said tunable optical translator.

7. The method of claim 1, further comprising:
determining if the received client signal is valid; and
if the client signal is determined not to be valid, generating an alarm.

8. The method of claim 1, wherein the network element is an end terminal of an optical line system having hi-directional optical translators.

9. The method of claim 1, wherein the network element is an optical add/drop module.

10. The method of claim 9, wherein the optical add/drop module comprises more than one line through the network element.

11. The method of claim 10, further comprising determining point to point connection associations for each of the more than one lines through the network element.

12. A network element, comprising:
at least one tunable optical translator for converting client signals into channels supported by said at least one tunable optical translator for transmission;
at least one multiplexer for combining the channels of said at least one optical translator;
a detector for determining the presence and measuring the power of an optical signal; and
an optical light source for providing an optical signal;
wherein said network element is configured to:
receive a client signal at said at least one tunable optical translator;
determine a set of channels supported by said at least one tunable optical translator that can support the client signal;
eliminate unusable channels from the determined set of channels;
determine the optical transmission power level of each remaining channel in the set; and
select a channel with the highest determined optical transmission power level to transmit the client signal.

13. The network element of claim 12, wherein said detector comprises an optical channel monitor.

14. The network element of claim 12, wherein said optical light source is located within said at least one tunable optical translator 15. The network element of claim 12, wherein said optical light source comprises a laser.

16. The network element of claim 12, further comprising a database of associations for storing point to point connection associations.

17. The network element of claim 12, further configured to:
add a point to point connection association for the selected channel to a database of associations.

18. The network element of claim 12, further configured to:
determine if the received client signal is valid; and
if the client signal is determined not to be valid, generate an alarm.

19. The network element of claim 12, wherein said network element comprises more than one line for transmission.

20. The network element of claim 19, further configured to:
determine a point to point connection association for each of the more than one lines through the network element.

21. An optical line system, comprising:
at least two network elements, each of said network elements comprising;
at least one tunable optical translator for convening client signals into channels supported by said at least one tunable optical translator for transmission;
at least one multiplexer for combining the channels of said at least one optical translator;
a detector for determining The presence of art optical signal; and
an optical light source for providing an optical signal;
wherein each of said network elements is configured to:
receive a client signal at said at least one tunable optical translator;
determine a set of channels supported by said at least one tunable optical translator That can support the client signal;
eliminate unusable channels from the determined set of channels;
determine the optical transmission power level of each remaining channel in the set; and
select a channel with the highest determined optical transmission power level to transmit the client signal.

22. The optical line system of claim 21, wherein said network elements comprise end terminals.

23. A method for automatically provisioning a channel added to a network element, comprising:
receiving a client signal at a tunable optical translator of the network element;
determining a set of channels supported by the tunable optical translator that can support the client signal;
performing a laser off scan process for the determined set of channels;
determining, for each of the channels in the set, if a signal is present on a line side of the network element during the laser off scan process;
eliminating channels from the determined set that have existing connections, that have signals present on a line side of the network element in the laser off scan process, and that have not been equipped or otherwise provisioned for transmission;
tuning the optical translator to each of the remaining channels in the set and determining the optical transmission power level of each remaining channel during a laser on scan process; and
selecting a channel with the highest determined optical transmission power level to transmit the client signal.

24. The method of claim 23, further comprising:
adding a point to point connection association for the selected channel to a database of associations.

25. The method of claim 24, wherein said laser off scan process comprises substantially turning off a signal transmission laser in the tunable optical translator and conducting an optical spectrum analysis on an optical output of a line side of the network element to determine, for each of the channels in the set, if a signal is present on a line side of the network element.

26. The method of claim 24, wherein said laser on scan process comprises turning on a signal transmission laser in the tunable optical translator and conducting an optical spectrum analysis on an optical output of a line side of the network element to determine the optical transmission power level.

* * * * *